(12) United States Patent
Vanderpool et al.

(10) Patent No.: US 7,191,493 B2
(45) Date of Patent: Mar. 20, 2007

(54) GRAB HANDLE AND BEZEL ASSEMBLY

(75) Inventors: Vaughn Darius Vanderpool, Fowlerville, MI (US); Steve Walter Brow, Milford, MI (US); Erik Richard Davis, Commerce Township, MI (US)

(73) Assignee: Intier Automotive Inc., Newmarket (CA)

( * ) Notice: Subject to any disclaimer, the term of this patent is extended or adjusted under 35 U.S.C. 154(b) by 133 days.

(21) Appl. No.: 10/954,908

(22) Filed: Sep. 30, 2004

(65) Prior Publication Data

US 2006/0026799 A1    Feb. 9, 2006

Related U.S. Application Data

(60) Provisional application No. 60/598,712, filed on Aug. 4, 2004.

(51) Int. Cl.
*E05B 1/00*     (2006.01)
*E05C 1/12*     (2006.01)

(52) U.S. Cl. ............... 16/412; 16/422; 16/436

(58) Field of Classification Search .............. 16/412, 16/415, 413, 425; D8/313; 292/336.3, 347, 292/348, DIG. 31, DIG. 63, DIG. 53; 296/146.7, 296/1.02; 312/348.6, 244
See application file for complete search history.

(56) References Cited

U.S. PATENT DOCUMENTS

| D51,196 | S | * | 8/1917 | Baker ..................... D6/524 |
| 3,072,955 | A | * | 1/1963 | Mitchell ................... 294/171 |
| 3,328,824 | A | * | 7/1967 | Chalfant .................... 15/171 |
| 3,641,913 | A | * | 2/1972 | Dennis ..................... 454/316 |
| 3,759,473 | A | * | 9/1973 | Sosaya ..................... 248/27.1 |
| 4,021,072 | A |   | 5/1977 | Belanger |
| 4,949,508 | A | * | 8/1990 | Elton ........................ 49/502 |
| 5,042,855 | A | * | 8/1991 | Bennett et al. ............. 292/241 |
| 5,123,304 | A | * | 6/1992 | Carmien ..................... 76/111 |
| 5,210,905 | A | * | 5/1993 | Dietz et al. ................ 16/429 |
| 5,355,554 | A | * | 10/1994 | Magoon ..................... 16/412 |
| 5,529,370 | A |   | 6/1996 | Veit |

(Continued)

FOREIGN PATENT DOCUMENTS

GB        2029491  A  *  3/1980

(Continued)

*Primary Examiner*—Robert J. Sandy
*Assistant Examiner*—Andre' L. Jackson
(74) *Attorney, Agent, or Firm*—Honigman Miller Schwartz and Cohn LLP

(57) ABSTRACT

A grab handle and bezel assembly includes a bezel and a grab handle capable of being received within the bezel. The grab handle is generally non-circular in cross section for properly locating the grab handle within the bezel and for preventing rotation of the grab handle. For example, the grab handle can be D-shaped in cross section having an arcuate surface portion defining a Class "A" surface that is visible to an occupant, and a flat surface portion defining a Class "B" surface that is not visible to the occupant. In this manner, an amount of Class "A" surface treatment of the grab handle can be minimized, thereby reducing the cost of the grab handle and bezel assembly. The grab handle and bezel assembly can securely mounted to a trim component, such as a door bolster, by disposing opposite ends of the grab handle between opposing walls of the bezel and passing a fastener through the door bolster, the bezel and the grab handle.

9 Claims, 4 Drawing Sheets

U.S. PATENT DOCUMENTS

| | | | |
|---|---|---|---|
| 5,740,587 A * | 4/1998 | Onai et al. ................... | 16/412 |
| 5,987,943 A * | 11/1999 | Verga et al. ................... | 70/208 |
| D433,012 S * | 10/2000 | Arsenault ................... | D14/221 |
| 6,385,816 B1 * | 5/2002 | Baldas et al. ................... | 16/412 |
| 6,494,780 B1 * | 12/2002 | Norbury, Jr. ................... | 454/319 |
| 6,546,674 B1 | 4/2003 | Emerling et al. | |
| 6,647,594 B1 | 11/2003 | Deb et al. | |
| D489,957 S * | 5/2004 | Lane ........................... | D8/306 |
| 6,735,824 B2 | 5/2004 | Tisol, Jr. et al. | |
| 6,802,544 B1 * | 10/2004 | Lane ........................... | 292/336.3 |
| 2004/0083575 A1 * | 5/2004 | Chou ........................... | 16/110.1 |
| 2004/0123446 A1 | 7/2004 | O'Brien et al. | |
| 2005/0140168 A1 * | 6/2005 | Emerling ................... | 296/146.7 |

FOREIGN PATENT DOCUMENTS

| | | |
|---|---|---|
| KR | 132970 Y1 | 10/1998 |
| KR | 1060597 A | 7/2001 |
| WO | WO-02/076776 A1 | 10/2002 |

* cited by examiner

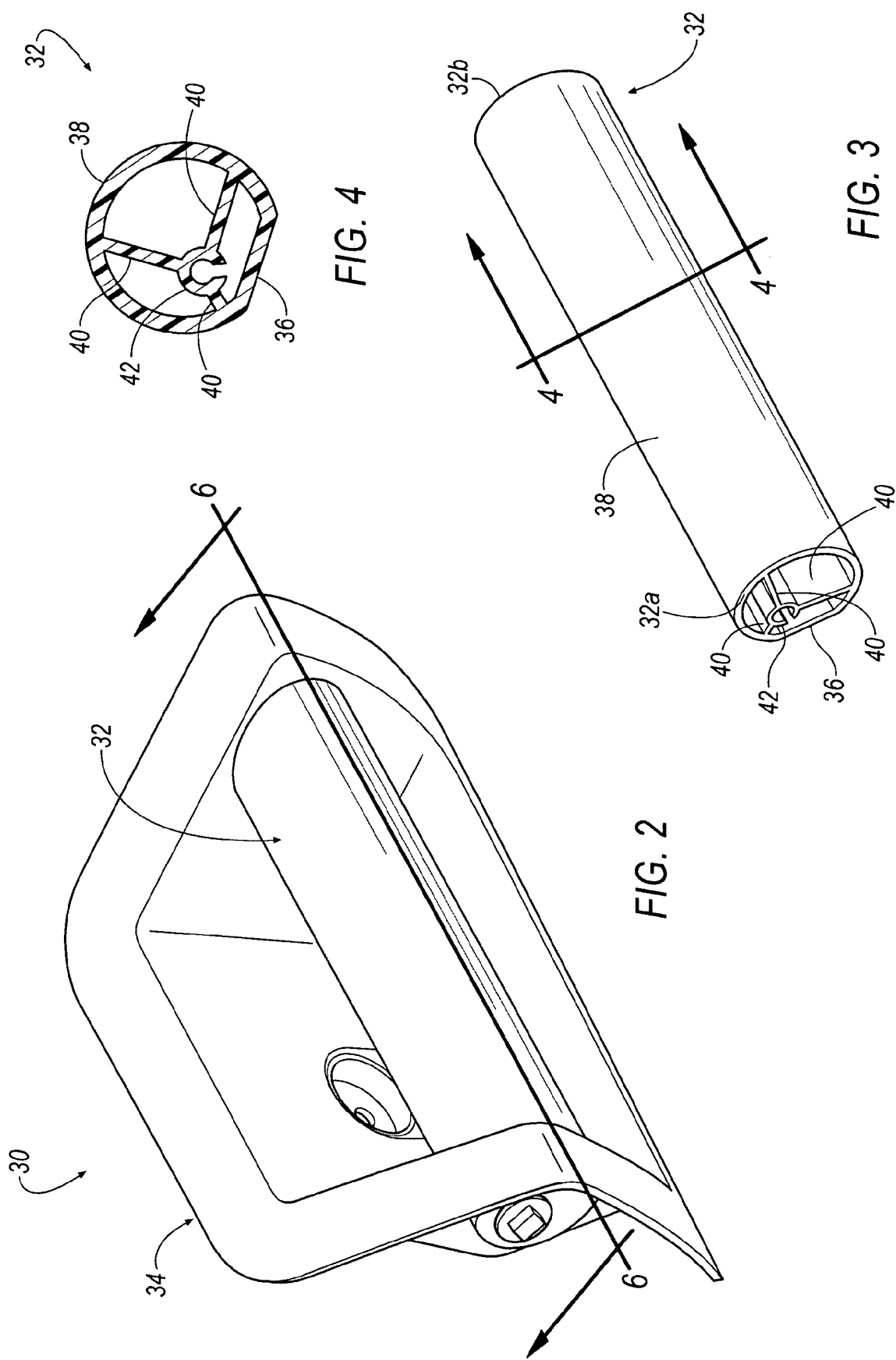

GRAB HANDLE AND BEZEL ASSEMBLY

This application claims the benefit of U.S. Provisional Application No. 60/598,712, filed on Aug. 4, 2004, the entire contents of which are herein incorporated by reference.

BACKGROUND OF THE INVENTION

1. Field of the Invention

The invention relates in general to a trim component, such as a door trim panel, and in particular to a door trim panel having a grab handle and bezel assembly mounted thereon.

2. Description of the Related Art

Motor vehicles typically include a vehicular door assembly including a door trim panel attached to an interior structural panel. The door trim panel serves a dual purpose. First, the door trim panel conceals the mechanical and electrical components of the door and, second, the door trim panel adds to an aesthetically pleasing passenger compartment. The door trim panel is commonly constructed of a molded rigid base portion covered by a trim cover such as cloth, vinyl, leather or a combination thereof. One or more openings may be formed in the door trim panel for receiving and securing various components to the vehicular door assembly. These components include a grab handle, a door lock and release lever, audio speakers and grills, and electronic window controls.

Typically, accessories, such as grab handles or door pulls, are secured to the door trim panel by a common, threaded fastener that passes through the accessory and into the frame or substrate of the vehicle. Unfortunately, the structures that enable the use of threaded fasteners tend to be rather complicated, requiring numerous parts and steps in their assembly. In addition, the securing grab handle or door pull has a tendency to become loosened over time and can begin to move and/or rotate. Further, the entire outer surface of the grab handle required to be finished to provide an aesthetically pleasing Class "A" surface, even though the entire surface may not have been visible to the occupant. Accordingly, there is a need for a simplified structure for securing attaching vehicle accessories to the substrate of the vehicle to reduce cost and prevent movement of the accessory.

SUMMARY OF THE INVENTION

To solve these and other problems associated with conventional grab handle and bezel assemblies, the inventors of the invention have developed a grab handle and bezel assembly comprising a bezel, and a grab handle capable of being mounted to the bezel. The grab handle is generally non-circular in cross-sectional shape for providing an aid in locating the grab handle when mounted to the bezel.

In another aspect of the invention, a grab handle and bezel assembly comprises a bezel having two opposing side walls, each side wall having at least one aperture, and a grab handle having opposite ends, and a hub and spokes within an interior of the grab handle. The grab handle is mounted to the bezel by placing the opposite ends of the grab handle adjacent the opposing side walls of the bezel and passing a fastener through the at least one aperture of the bezel, through one of the opposite ends of the grab handle, and into the hub of the grab handle.

In yet another aspect of the invention, a trim component comprises a door trim panel, a bezel capable of being mounted to the door trim panel, and a grab handle capable of being mounted to the bezel. The grab handle and bezel are mounted to the door trim panel by inserting the bezel into a recessed area of the door trim panel, disposing opposite ends of the grab handle between opposing walls of the bezel, and passing a fastener through the door trim panel, the bezel and into the grab handle.

BRIEF DESCRIPTION OF THE DRAWINGS

In the drawings:

FIG. 2 shows a front perspective view of the grab handle and bezel assembly according to an embodiment of the invention.

FIG. 3 shows a front perspective view of the grab handle according to an embodiment of the invention.

FIG. 4 shows an end view of the grab handle of FIG. 3.

DESCRIPTION OF THE PREFERRED EMBODIMENT

Figure 1:
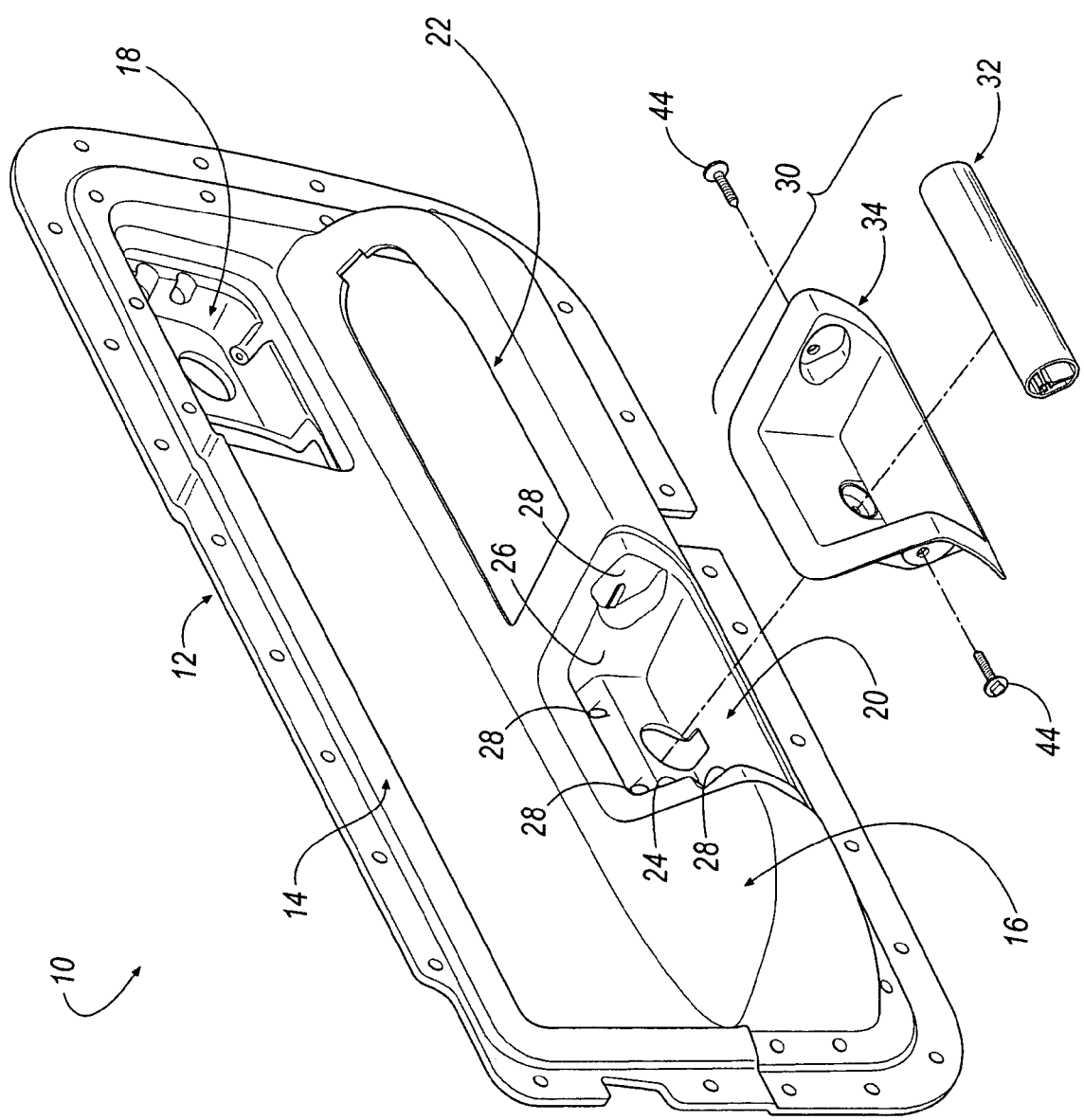
FIG. 1 shows an exploded perspective view of a door trim panel substrate including a grab handle and bezel assembly according to an embodiment of the invention.

Referring now to FIG. 1, a vehicular door assembly is generally shown at 10. The vehicular door assembly 10 includes a door trim panel 12 with an upper door trim panel 14 and a lower door trim panel 16. Both the upper and lower door trim panels 14, 16 may be formed from a substrate material, such as polypropylene, and the like, and then covered by a trim cover (not shown). The trim cover may be cloth, vinyl, leather, or a combination thereof. The upper door trim panel 14 may include one or more recessed areas 18 for mounting any number of accessories. Similarly, the lower door trim panel 16 may include a recessed area 20 and an aperture 22. The recessed area 20 includes opposing walls 24, 26 and one or more apertures 28. It will be appreciated that the invention is not limited by the contour or profile of the door trim panel 12, and that the invention can be practiced with any desirable contour. For example, the upper and lower door trim panels 14, 16 may have a generally planar contour. In another example, the upper door trim panel 14 may have a generally planar contour, whereas the lower door trim panel 16 may have a generally non-planar contour.

Referring now to FIGS. 1 and 2, the vehicular door assembly may also include a grab handle and bezel assembly, shown generally at 30. The grab handle and bezel assembly 30 includes a grab handle 32 and a bezel 34. The grab handle 32 can be made of any suitable material, such as metal, plastic, and the like. Similarly, the bezel 34 can be made of any suitable material, such as metal, plastic, and the like.

Referring now to FIGS. 3 and 4, one aspect of the invention is that the grab handle 32 is generally of a hollow construction with a non-circular cross section. In the illustrated embodiment, for example, the grab handle 32 is D-shaped in cross section defining a flat surface portion 36 and an arcuate surface portion 38 between opposing ends 32a, 32b. The flat surface portion 36 defines a Class "B" surface portion of the grab handle 32, and the arcuate surface portion 38 defines a Class "A" surface portion of the grab handle 32. The interior of the grab handle 32 includes one or more ribs or spokes 40 that extend outwardly from a hub 42, which is generally C-shaped in cross section. The spokes 40 may be of equal or unequal length. In the illustrated embodiment, at least one spoke 40 has an unequal length, resulting in the hub 42 being non-concentric with the interior of the grab handle 32. The hub 42 is sized to accommodate a fastener 44 (FIG. 1), such as screw, bolt, snap, and the like. Preferably, the fastener 44 is a threaded fastener of a type well-known in the art.

Figure 5:
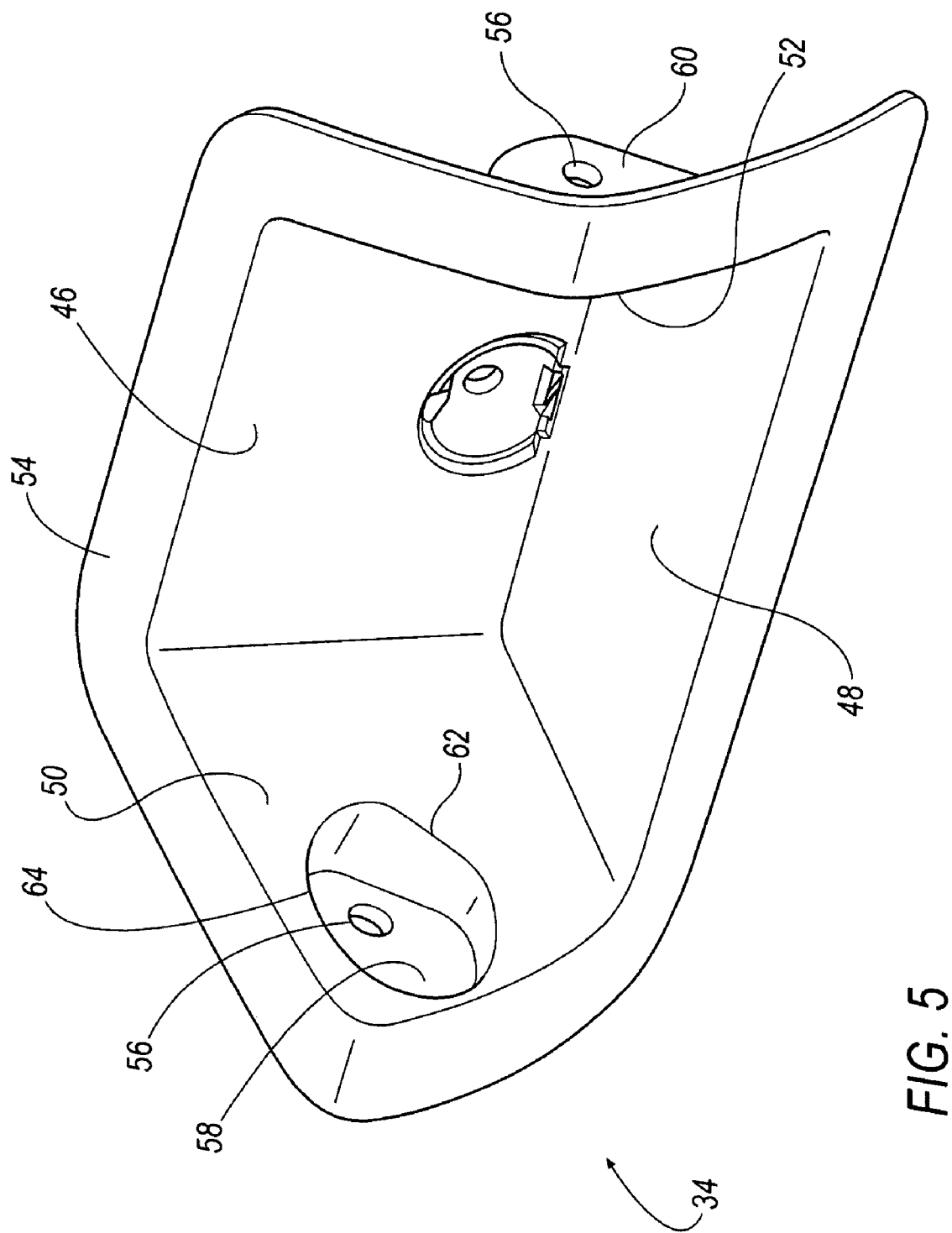
FIG. 5 shows a front perspective view of the bezel according to an embodiment of the invention.

Referring now to FIG. 5, the bezel 34 includes a back wall 46, a bottom wall 48, and a pair of opposing side walls 50, 52. The bezel 34 may also include a ledge 54 around the perimeter of one or more of the walls 46, 48, 50 and 52. Each side wall 50, 52 includes an aperture 56 that is sized to allow the fastener 44 to pass therethrough. In addition, each side wall 50, 52 includes a recessed pocket 58, 60, respectively, having a profile that generally corresponds to the profile of the grab handle 32. For example, in the illustrated embodiment, the recessed pockets 58, 60 have a generally D-shaped profile comprising a flat portion 62 and an arcuate portion 64. Similar to the flat portion 36 of the grab handle 32, the flat portion 62 of the recessed pocket 58, 60 acts as a locator for properly positioning the grab handle 32 during installation. In addition, the recessed pockets 58, 60 also support the grab handle 32 once the grab handle 32 is mounted to the bezel 34. The recessed pockets 58, 60 are located on the side walls 50, 52 such that there is sufficient clearance for a user to easily grasp the grab handle 32 by placing their fingers in contact with the flat surface portion 36 of the grab handle 32. In addition, the distance between the side walls 50, 52 is preferably slightly larger than the length of the grab handle 32 such that the grab handle 32 can be snugly disposed in the recessed pockets 58, 60 between the side walls 50, 52. The bezel 34 is formed to a shape that is generally compatible with the recessed area 20 of the lower door trim panel 16 such that the bezel 34 can be easily inserted into the recessed area 20. Once inserted, the ledge 54 may act as an aesthetically pleasing trim for the grab handle and bezel assembly 30.

Figure 6:
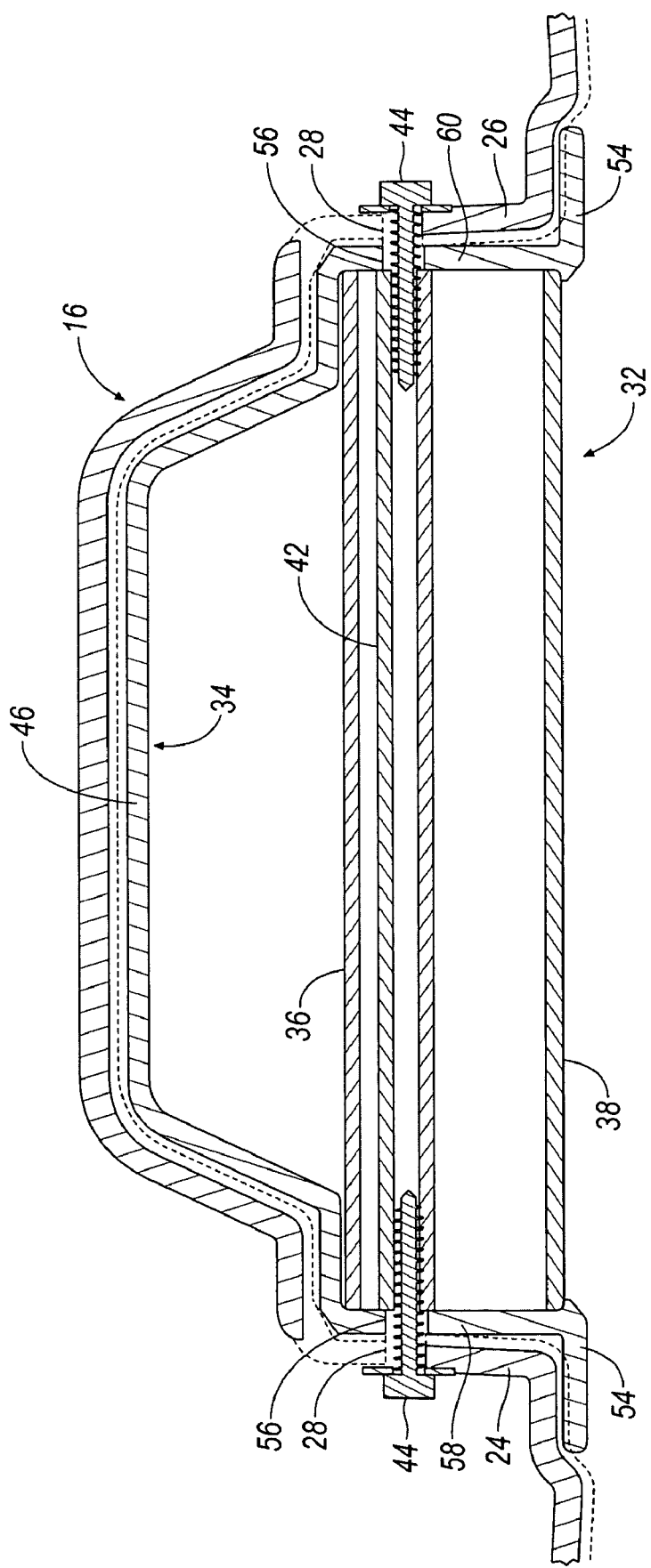
FIG. 6 shows a cross-sectional view of the grab handle and bezel assembly of the invention taken along line 6—6 of FIG. 2.

Referring now to FIG. 6, the installation of the grab handle and bezel assembly 30 will now be described. Generally, it is quite easy to assemble the grab handle and bezel assembly 30 of the invention. First, the bezel 34 is inserted between the opposing walls 24, 26 of the recessed area 20 of the lower door trim panel 16. Then, the grab handle 32 is disposed between the side walls 50, 52 such that the opposing ends 32a, 32b are received in the recessed pockets 58, 60 of the bezel 32. Specifically, the grab handle 32 is inserted into the recessed pockets 58, 60 such that the flat surface portion 36 of the grab handle 32 mates with the flat portion 62 of the recessed pockets 58, 60 and prevent rotation of the grab handle 32 once mounted to the bezel 34.

Upon proper insertion of the bezel 34 into the recessed area, the one or more apertures 28 of the recessed area 20 are aligned with the aperture 56 of the bezel 34. Further, upon proper insertion of the grab handle 32 into the bezel 34, the aperture 56 of the bezel 34 is aligned with the hub 42 of the grab handle 32. Thus, the one or more apertures 28 of the recessed area 20 are aligned with the hub 42 of the grab handle 32 such that the fastener 44 can be inserted through the substrate material of the side walls 24, 26 of the lower door trim panel 16, through the bezel 34, and into the hub 42 of the grab handle 32. In this manner, the installation of the grab handle and bezel assembly 30 of the invention can be performed very simply, thereby reducing the overall installation time as compared to conventional assemblies. In addition, a single fastener 44 inserted into the opposite ends 32a, 32b of the grab handle can be used to fasten the grab handle and bezel assembly 30 to the lower door trim panel 16. Further, once the grab handle and bezel assembly 30 is installed, the flat surface portion 36 that defines a Class "B" surface portion of the grab handle 32 is not visible to the occupant, while the arcuate surface portion 38 that defines a Class "A" surface portion of the grab handle 32 is visible. As a result, the entire outer surface of the grab handle 32 does not constitute a Class "A" surface, but only a portion of the outer surface, thereby minimizing the finishing costs associated with the grab handle and bezel assembly 30.

It will be appreciated that the installation can be performed by first inserting the grab handle 32 into the bezel 34, and then inserting the grab handle and bezel assembly 30 into the recessed area 20 of the lower door trim panel 16. It will be appreciated that the grab handle and bezel assembly 30 can be mounted to any location on the door trim panel 12, and that the invention is not limited by the location on the door trim panel 12. It will also be appreciated that the locating and anti-rotation principals of the invention can be applied to mount any accessory to a substrate or structure of a vehicle.

While the invention has been specifically described in connection with certain specific embodiments thereof, it is to be understood that this is by way of illustration and not of limitation, and the scope of the appended claims should be construed as broadly as the prior art will permit.

What is claimed is:

1. A grab handle assembly, comprising:
a bezel having first and second opposing side walls, each of said first and second opposing side walls defining an aperture;
a grab handle having first and second ends and a longitudinal shaft extending therebetween, said grab handle defining a fastener receiving cavity located at each of said opposite ends of said grab handle, said first and second ends of said grab handle positioned adjacent to said first and second opposing side walls of said bezel, said fastener receiving cavity located at each of said first and second ends of said grab handle positioned adjacent to said apertures of said first and second opposing side walls; and
fastening means extending through each of the apertures of said first and second opposing side walls of said bezel and said fastener receiving cavity located at each of said first and second ends of said grab handle, said fastening means fixedly mounting said first side wall of said bezel to said first end of said grab handle and said second side wall of said bezel to said second end of said bezel,
wherein said first side wall includes a first recessed area defining said aperture therewithin, and wherein said second side wall includes a second recessed area defining said aperture therewithin and wherein at least a portion of said first end of said grab handle is positioned within said first recessed area such that said aperture of said first recessed area is positioned adjacent said fastener receiving cavity located at said first end of said grab handle, and at least a portion of said second end of said grab handle is positioned within said second recessed area such that said aperture of said second recessed area is positioned adjacent said fastener receiving, cavity located at said second end of said grab handle.

2. A grab handle assembly according to claim 1, wherein said fastener receiving cavity is a single cavity extending across the longitudinal shaft and between said first and second ends of said grab handle.

3. A grab handle assembly according to claim 1, wherein said fastener receiving cavity is threaded.

4. A grab handle assembly according to claim 1, wherein the fastening means includes a first fastener and a second fastener, said first fastener extending through said aperture of said first side wall and said fastening receiving cavity located at said first end of said grab handle fixedly mounting said first side wall of said bezel to said first end of said grab handle, said second fastener extending through said aperture of said second side wall and said fastening receiving cavity within said second end of said grab handle fixedly mounting said second side wall of said bezel to said second end of said grab handle.

5. A grab handle assembly according to claim 1, wherein each of said apertures have a central axis, and wherein each of said fastener receiving cavity located at each of said ends of said grab handle have a central axis that lies in the sane axis as said central axis of said apertures.

6. A grab handle assembly according to claim 1, wherein said grab handle includes spokes extending from an interior surface of said grab handle toward a hub that defines said fastener receiving cavity located at each of said opposite ends of said grab handle.

7. A grab handle assembly according to claim 1, wherein said first and second ends of said grab handle have keyed cross-sectional shapes, and further wherein said first and second recessed areas of said first and second side walls have cross-sectional shapes that correspond to said keyed cross-sectional shapes of said grab handle whereby the keyed interrelationship between the first and second ends of the grab handle and the first and second recesses generally prevent rotation of the grab handle.

8. A grab handle assembly according to claim 7, wherein the grab handle includes a first surface portion and a second surface portion, wherein the first surface portion generally faces toward the bezel and the second surface portion of the grab handle generally faces away from the bezel.

9. A grab handle assembly according to claim 7, wherein said cross-section shapes have a semi-circular portion end a flat portion, and further wherein said semi-circular portion has a finished surface and wherein said flat portion has a surface selected from the group consisting of an unfinished surface, or a semi-finished surface.

* * * * *

UNITED STATES PATENT AND TRADEMARK OFFICE
CERTIFICATE OF CORRECTION

PATENT NO.        : 7,191,493 B2
APPLICATION NO.  : 10/954908
DATED             : March 20, 2007
INVENTOR(S)      : Vaughn D. Vanderpool et al.

It is certified that error appears in the above-identified patent and that said Letters Patent is hereby corrected as shown below:

In the Claims:

In Claim 1, Line 62, please delete the comma "," after the phrase "fastener receiving."

In Claim 5, Line 17, change "sane" to -- same--. Claim 5 should also be renumbered as Claim 8.

Claim 6 should be renumbered as Claim 9.

Claim 7 should be renumbered as Claim 5.

Claim 8 should be renumbered as Claim 6.

Claim 9 should be renumbered as Claim 7.

Signed and Sealed this

Twenty-second Day of May, 2007

JON W. DUDAS
*Director of the United States Patent and Trademark Office*